Patented Dec. 9, 1924.

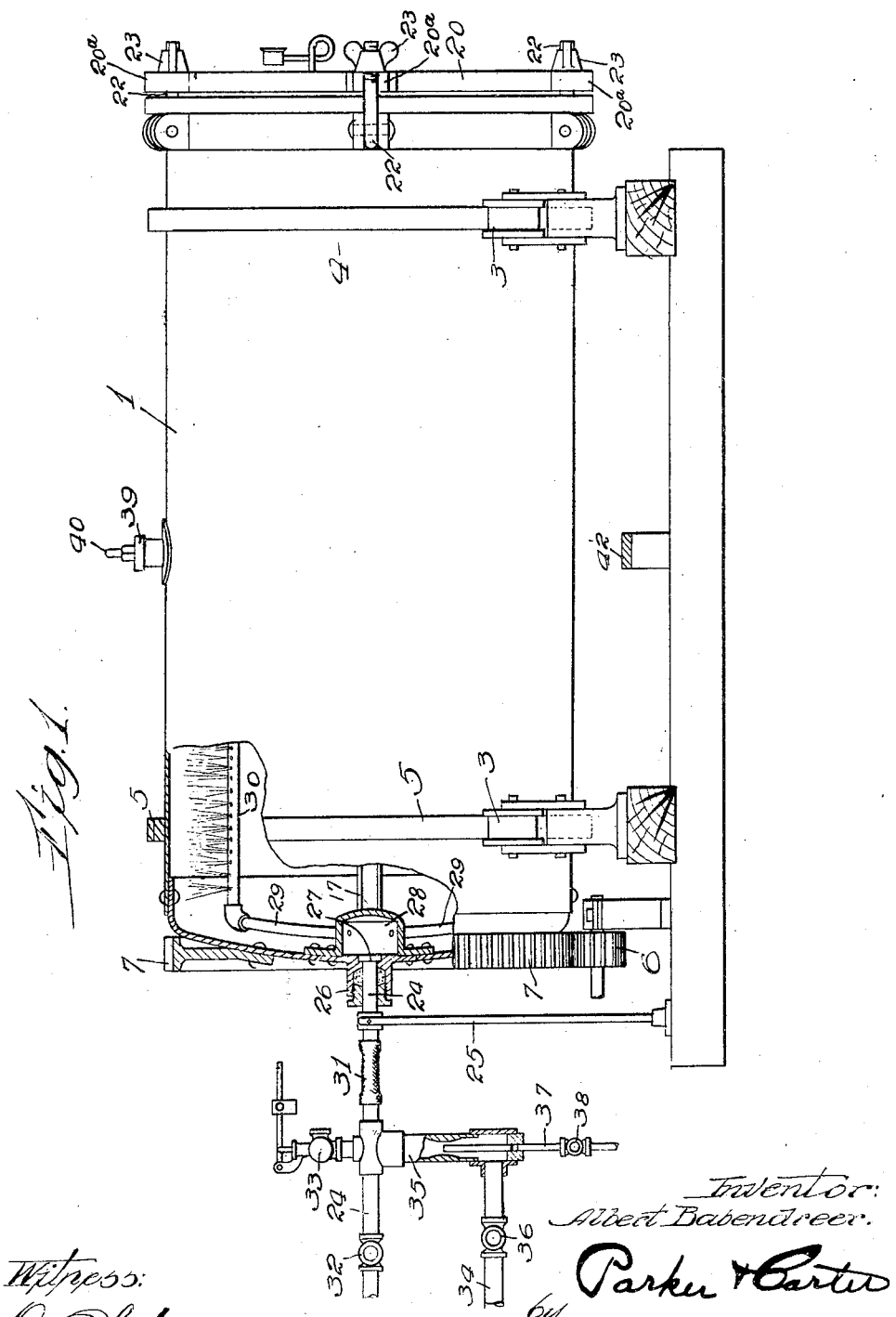

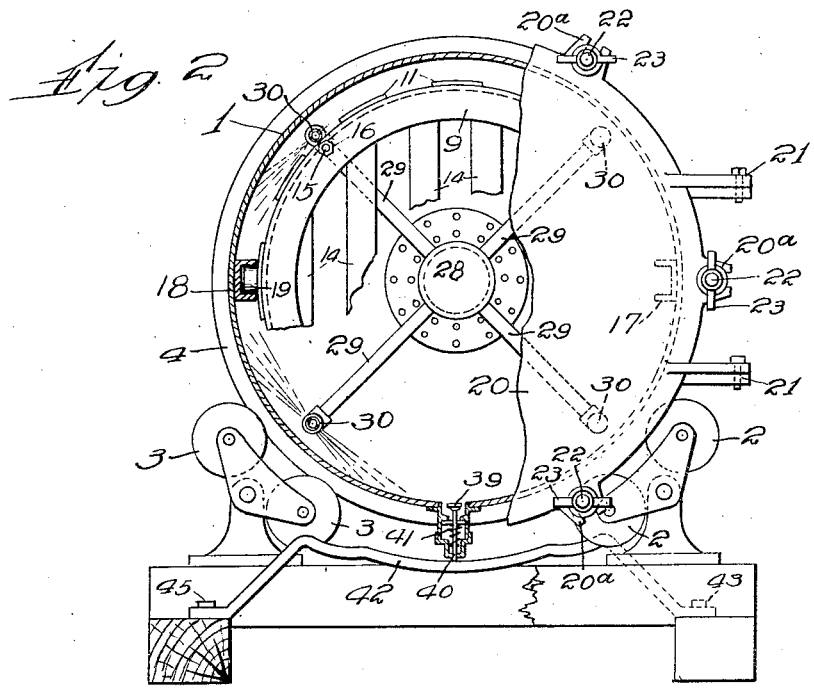
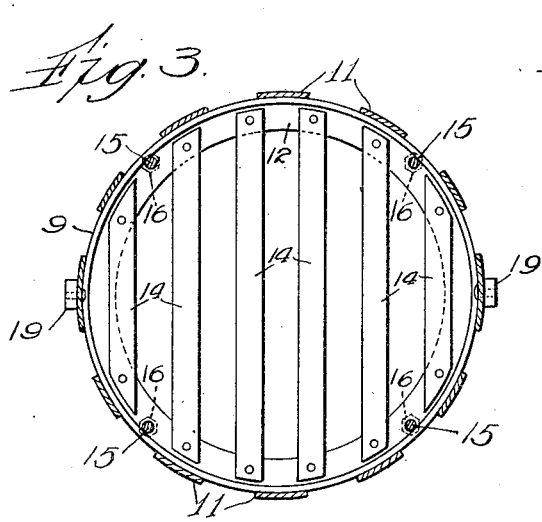
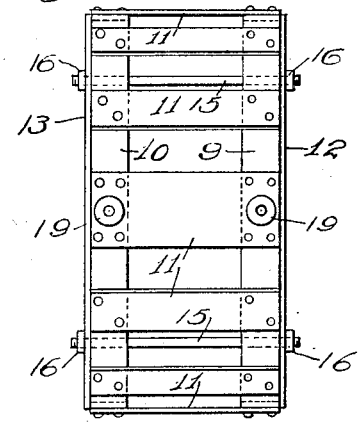
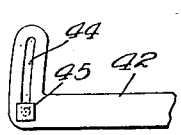

1,518,552

UNITED STATES PATENT OFFICE.

ALBERT BABENDREER, OF OCEAN SPRINGS, MISSISSIPPI, ASSIGNOR TO WHOLE GRAIN WHEAT COMPANY, OF PHOENIX, ARIZONA, A CORPORATION OF ARIZONA.

APPARATUS FOR TREATING FOODS.

Application filed September 17, 1917, Serial No. 191,791. Renewed March 1, 1923.

*To all whom it may concern:*

Be it known that I, ALBERT BABENDREER, a citizen of the United States, residing at Ocean Springs, in the county of Jackson and State of Mississippi, have invented a certain new and useful Improvement in Apparatus for Treating Foods, of which the following is a specification.

This invention relates to a new and improved apparatus for treating foods such as wheat, oats, rice, corn or other grain, legumes or the like, and has for its object to provide a new and improved apparatus of this description. The invention has among other objects to provide an apparatus for treating foods that require cooking so that such foods will retain substantially all of the elements of which they are composed in their natural form without loss thereof through evaporation or other means and also preserve, if desired, the foods in their whole or whole grain form when prepared, and to further preserve them after preparation, through long periods of time, and to make them tasty, cheap and healthful and when a grain like wheat is used, to provide a complete balanced food having all of the elements necessary for the growth of the body and the preservation thereof in a healthful condition.

The invention is illustrated in the accompanying drawings, wherein—

Fig. 1 is a side elevation in part section showing one form of apparatus embodying the invention.

Fig. 2 is an end elevation of the apparatus shown in Fig. 1 with parts broken away.

Fig. 3 is an end view of the device for holding the receptacles in which the food is contained.

Fig. 4 is a side elevation of the device illustrated in Fig. 3.

Fig. 5 is a plan view of the adjustable end of the valve part which actuates the tank valve.

Like numerals refer to like parts throughout the several figures.

In preparing the food, the grain, legume or other material is placed with sufficient moisture in a receptacle, preferably the receptacle in which it is sold to the consumer, the receptacle being only partially filled and hermetically sealed and this receptacle and the material is then heated and while being heated is moved so as to move the material from one portion thereof to another in order to secure proper and uniform treatment of the different portions of the material and the proper absorption of moisture by all of the different portions thereof. The receptacle and material therein are then cooled and are ready for distribution. A suitable mechanism of any desired form is preferably provided by means of which a number of receptacles or cans may be simultaneously treated in order to reduce the cost of preparing the food. In the accompanying drawings one form of apparatus for this purpose is shown.

As illustrated in such drawings, a tank 1 is provided into which the receptacles containing the food to be treated are placed. This tank is preferably arranged so that it may be rotated, and as illustrated in the drawing, is mounted upon the rollers 2 and 3. Rollers at each end are shown. The rollers are preferably grooved, as illustrated, and the revolving tank is provided with the tracks 4 and 5, one at each end, which preferably fit into the grooves of the rollers. The tank is rotated in any desired manner, as by means of the gear 6 which engages a circular rack 7 connected with the tank.

The receptacles containing the food to be treated are then placed in the tank 1 and the tank is properly heated and is then moved, so as to move the receptacles containing the food in order to move the food therein to different portions of said receptacle. These receptacles may be of any desired form, size, shape or arrangement. In order to show a specific construction, the food may be placed in any desired receptacles such, for example, as cans. A suitable amount of the food such as the grain or legume to be treated is placed in each can or receptacle with a sufficient amount of moisture. The moisture may be applied in any desired manner, either before the food is placed in the can or after it is placed in the can. The grain is preferably taken in a raw condition and a portion thereof is placed in each receptacle and in such receptacle the desired amount of liquid is placed, and the receptacle then sealed. The liquid may be water or any other liquid with which it is desired to treat the food. Water and salt and sugar are preferably used in sufficient quantities to secure the desired palatability. The liquid may be therefore a solution of salt and sugar in water or any other treating solution. It is of course evident that the amount of moisture used will depend upon the results desired and will be regulated in accordance with the results. It is preferable, however, in treating grain, to use such an amount of moisture that when the whole grain is treated, this moisture when absorbed will leave it after treatment in its whole form. Many or all of the grains may of course be slightly cracked open but they still retain the whole form of the grain. When the receptacles or cans have the proper amount of material therein and are sealed, they are then placed in the tank 1. For convenience there is shown a particular form of holder for holding these receptacles or cans. In Figs. 3 and 4 one form of the holder is shown which consists of the frame pieces 9 and 10 connected together by connecting pieces 11, having open spaces between them. There are removable end pieces 12 and 13 which are made up of the separated strips 14 which are connected with a frame piece which holds them in position. It is preferable to make both of the ends removable, said ends being held in place by rods 15 having the nuts or removable engaging pieces 16 at both ends thereof. The distance between the end pieces of the holders may be substantially the height of the cans or receptacles, although this distance will of course depend upon the conditions of use.

After the cans or receptacles are placed in these holders, said holders are then introduced into the tank 1. In the construction shown the tank is provided on the inside with the guide-ways 17 and 18 (see Fig. 2) and the receptacle holders are provided with projections 19 which fit therein. The projections preferably consist of rollers, so that when placed in the guide-way the holder can be easily moved into the tank. Several of the holders are placed in the tank 1 and the tank is then closed in any desired manner. In the construction shown the tank is provided with an end piece 20 hinged at 21 and is also provided with the hinged clamping pieces 22 having the nuts 23. The clamping pieces may be moved into the slotted parts 20ª (see Fig. 2) and the nuts then tightened to hold the door or end piece in proper position. Some means is provided for heating the tank while the receptacles or cans are contained therein, and any suitable means may be provided. The tank is preferably heated with a suitable heating agent such as vapor or steam. When this is done the vapor, steam or other heating agent from the pipe 24 may enter through the axis of the tank. It is preferable for this purpose to support the pipe upon the support 25 so that it enters the tank at its axis through a stuffing box 26. The vapor or steam passes from the end 27 of the pipes into the chamber 28 and then through pipe 29 to the perforated pipe 30 which extends longitudinally along the tank. These perforated pipes are preferably perforated on both sides so as to distribute the vapor or steam, as shown in Fig. 2 so that it will not directly strike the receptacles or cans in the tank. The pipe 24 is preferably provided with a flexible section 31 and also with a shut-off valve 32 and a safety valve 33 set so as to automatically open when the pressure reaches a predetermined amount, so as to prevent too great a pressure in the tank 1. The pipe 24 due to the rotation of the drum must be in proper alignment, and by having the flexible section 31 which can be connected to pipe 24 regardless of the alignment of the pipe 24. It also prevents the pipe 24 and associated parts from causing binding action. It is also preferable to provide means for admitting water to the pipe 34 connected by pipe 35 with the pipe 24, water passing through the same pipe as the steam, by shutting off the valve 32. The water pipe 34 also has a shut-off valve 36. Air may also be permitted to enter the tank by means of a pipe 37 which enters the pipe 35 which has a shut-off valve 38. The tank 1 may be provided with a relief valve 39 which may work simply through pressure or which may be automatically opened at intervals. Under the latter conditions the valve is provided with a stem 40, with a spring 41 which normally holds the valve in its closed position. As the tank rotates the stem 40 engages the part 42 which causes the stem to move to open the valve. This arrangement is shown clearly in Fig. 2. In carrying out the process with the particular construction shown, the cans or receptacles are placed in the tank, the tank closed, and the steam or vapor admitted, preferably at atmospheric pressure, the tank being rotated so as to cause the materials in the cans or receptacles to be forced by gravity from one portion of the can to another, so that the moisture will be evenly distributed and uniform product secured. Before removing the cans or receptacles from the tank the pressure or steam is increased to a sufficient amount so as to thoroughly sterilize the food product. This result can be secured by the pressure of several pounds say four or five pounds. The invention is not limited to any particular length of time or any particular method of applying the heat, as these factors will vary with the various materials treated and the results desired. In most cases, however, excellent results may be secured by heating the cans and the food therein in the tank 1 with steam at atmospheric pressure for several hours, say four hours and then increasing the pressure to several pounds above atmosphere, say four pounds, and heating with this increased pressure for say one hour, and then cooling. In some cases where there is an excess of treating liquid in the cans or receptacles, as where legumes are being treated, it is desirable to suddenly cool the material while the tank 1 is being rotated. This may be done by inserting a cooling fluid, such as cold water or air or the like. The water may be inserted through pipe 34 and the air or other gas through the pipe 37. With other material, such as grain, the cooling may be gradual. The movement of the cans or receptacles is preferably about a substantially horizontal axis, as this gives the best results, for by rotating or moving the mass of material about a substantially horizontal axis, such material is constantly tumbled toward the periphery of the receptacles, and comes in direct contact with the heating surface of the receptacle so that the heat penetrates the mass in a uniform manner in a much less time than if the heated mass is still and at the same time whatever treating liquid is in the receptacle or cans, is properly distributed throughout the mass of material. The length of time of the cooling may of course be varied. When vapor or steam is used in the tank 1 the valve 39 permits the water of condensation to escape, and hence, this water of condensation cannot collect in the tank. In order to make the matter clear, certain details and ways of treating the material have been described, but it is of course evident that the invention is not limited to these particular details except as they are set forth in the claims herewith presented.

When it is desired to insert a cooling fluid or to increase the pressure in the tank to a pressure above that of the atmosphere, the part 42 which controls the valve 39 may be moved so that the valve stem 40 does not engage it. This may be done by any desired construction. As shown, one end of the part 42 is pivotally held in place by the bolt 43. The other end is provided with the slot 44 through which passes the bolt 45. When it is desired to move the part 42 out of engagement with the valve stem, said part is moved laterally, the bolt 45 passing along the slot 44.

I claim:

1. An apparatus for treating foods, comprising an outside horizontal tank, mechanism for rotating said tank, means for heating said tank, and a plurality of receptacle-holders movably mounted in said tank, said tank having a free open space at the center thereof and provided with a vertical door extending across the end thereof through which the receptacle holders are inserted into and removed from the tank, said receptacle holders movable axially with relation to the tank but fixed against relative rotation with relation to said tank.

2. An apparatus for treating foods, comprising a tank, mechanism for rotating said tank, means for heating said tank, a plurality of receptacle-holders movably mounted in said tank, guide-ways on opposite sides of said tank substantially parallel with the axis thereof, and projections on said receptacle-holders adapted to engage said guide-ways so that the receptacle-holders may be moved axially along said tank.

3. An apparatus for treating foods, comprising a rotatable tank, means for inserting a heating agent into the interior of said tank while it is being rotated, a receptacle-holder for holding a plurality of receptacles containing the food to be treated, connecting means on opposite sides of said receptacle-holder for connecting it with the tank, said connecting means permitting the receptacle-holder to be moved axially with relation to the tank but holding it against rotation with relation to the tank, said receptacle-holder removably mounted in said tank so that when in position and the tank is rotated, the food in each receptacle will be moved from one portion thereof to another portion thereof.

4. An apparatus for treating foods comprising a tank, an axially located inlet connected with said tank through which a heating agent is inserted therein, means for supporting in said tank a plurality of receptacles containing food to be treated, an inlet for inserting said receptacles into the tank and located at the end thereof opposite to the inlet for the heating agent, and means for rotating said receptacles about a horizontal axis while being heated.

5. An apparatus for treating foods, comprising a rotatable tank, an inlet for said tank through which a heating agent is inserted therein, a chamber in the tank into which the heating agent is admitted, a plurality of perforated pipes inside of said tank substantially parallel with the axis thereof and connected with said chamber, and means for supporting a plurality of receptacles containing the food to be treated, in the space between said perforated pipes.

6. An apparatus for treating foods, comprising a rotatable tank, an inlet for said tank through which a heating agent is inserted therein, a chamber in the tank into which the heating agent is admitted, a plurality of perforated pipes inside of said tank substantially parallel with the axis thereof and connected with said chamber, a removable receptacle-holder for holding the receptacles in which the food to be treated is contained, said receptacle-holder mounted in the space between said perforated pipes.

7. A receptacle-holding device, comprising an annular frame, separate connecting pieces attached to said frame, two removable end pieces and supporting peripheral projections connected with said frame by means of which the frame is held in its operative position.

In testimony whereof, I affix my signature in the presence of two witnesses this 28th day of August, 1917.

ALBERT BABENDREER.

Witnesses:
LAUREL M. DOREMUS,
CHRISTINA DEANS.